US005157525A

United States Patent [19]

Eaton et al.

[11] Patent Number: 5,157,525

[45] Date of Patent: Oct. 20, 1992

[54] CONTROL OF LIQUID CRYSTAL DISPLAY VISUAL PROPERTIES TO COMPENSATE FOR VARIATION IN THE CHARACTERISTICS OF THE LIQUID CRYSTAL

[75] Inventors: Timothy J. Eaton, Chelmsford; Roger J. Pittock, Salcutt, Near Maldon, both of United Kingdom

[73] Assignee: EEV Limited, Chelmsford, United Kingdom

[21] Appl. No.: 601,136

[22] Filed: Oct. 23, 1990

[30] Foreign Application Priority Data

Oct. 27, 1989 [GB] United Kingdom ................ 8924221

[51] Int. Cl.[5] ................ G02F 1/133

[52] U.S. Cl. ................ 359/55; 359/48; 359/85; 359/86; 340/784; 340/793

[58] Field of Search ................ 350/331 T, 332, 333, 350/345; 340/713, 765, 784, 793, 812

[56] References Cited

U.S. PATENT DOCUMENTS

| | | | |
|---|---|---|---|
| 3,705,310 | 12/1972 | Wild | 350/331 T |
| 3,770,961 | 11/1973 | Westell | 350/331 T |
| 4,119,842 | 10/1978 | Hayden et al. | 350/331 T |
| 4,278,325 | 7/1981 | Kondo et al. | 350/331 T |
| 4,603,946 | 8/1986 | Kato et al. | 359/42 |
| 4,690,508 | 9/1987 | Jacob | 359/85 |
| 4,738,514 | 4/1988 | Stewart | 350/331 T |
| 4,760,389 | 7/1988 | Aoki et al. | 350/345 |
| 4,825,201 | 4/1989 | Watanabe et al. | 340/793 |
| 4,848,877 | 7/1989 | Miller | 359/86 |
| 4,919,520 | 4/1990 | Okada et al. | 350/331 T |
| 4,920,257 | 4/1990 | Fuerthbauer et al. | 359/36 |
| 4,962,376 | 10/1990 | Inoue et al. | 350/331 T |

FOREIGN PATENT DOCUMENTS

| | | | |
|---|---|---|---|
| 0039523 | 4/1981 | Japan | 350/331 T |
| 0246014 | 10/1987 | Japan | 350/331 T |
| 0098636 | 4/1988 | Japan | 359/55 |
| 0006927 | 1/1989 | Japan | 350/331 T |
| 2067812A | 7/1981 | United Kingdom . | |
| 2199439A | 7/1988 | United Kingdom . | |
| 2213303A | 8/1989 | United Kingdom . | |

OTHER PUBLICATIONS

Kahn et al.-"Temperature Dependence of Multiplexed TN-Liquid Crystal Displays" Non-Emissive Electro-optic Display-Plenum Press-New York-1976 pp. 289-297.

Dickson et al., "Control Circuit For Liquid Crystal Cells" IBM Technical Disclosure Bulletin-vol. 13, No. 11, Apr. 1971, p. 3517.

*Primary Examiner*—Stanley D. Miller

*Assistant Examiner*—Tai V. Duong

*Attorney, Agent, or Firm*—Spencer, Frank & Schneider

[57] ABSTRACT

The contrast or absolute brightness of a multiplexed LCD is maintained at its preselected value using a feedback arrangement which includes an LCD element functioning as a reference element. The reference element is not used to display information but is continually driven ON and OFF. The average transmissivity of the ON and OFF states is determined and compared with a reference value, the result of the comparison being used to control the voltage levels of the drive waveforms applied to the LCD. By selecting appropriate ratios between the ON and OFF times of the reference element, the LCD can be operated to give optimum contrast, or may have its absolute brightness varied. Control may be effected remotely by reprogramming the microprocessor which determines the timing of the drive waveforms.

12 Claims, 5 Drawing Sheets

CONTROL OF LIQUID CRYSTAL DISPLAY VISUAL PROPERTIES TO COMPENSATE FOR VARIATION IN THE CHARACTERISTICS OF THE LIQUID CRYSTAL

This invention relates to liquid crystal displays.

BACKGROUND OF THE INVENTION

Liquid crystal displays (LCDs) may be either directly driven or multiplexed. In directly driven LCDs, each segment or element has its own driver. In multiplexed LCDs, one driver drives a number of elements. For multiplexed LCDs having large numbers of elements, a matrix arrangement is commonly used, the matrix consisting of rows and columns of conductors having elements disposed at the intersection of each row and column conductor. The row and column conductors are energised by multiple level driving waveforms. The voltage levels of the waveforms are chosen according to the upper and lower transmission voltage threshold values of the liquid crystal and are conveniently generated by a resistive potential divider. This allows the voltage levels to be adjusted in step with each other by adjusting the voltage which is applied across the potential divider, e.g. by hand tuning. Such adjustment is required for initially setting up the display. Temperature-compensated LCDs are known, in which a temperature - dependent voltage source is included having a linear temperature voltage characteristic. Such temperature compensation gives acceptable performance over a limited temperature range, for example −5° to 45° C. If it is desired to operate over a wider range, it would be possible in principle to produce a voltage source having a non-linear temperature characteristic matching that of the display, but such a source would be considerably more complex and expensive than one having a linear characteristic, and would require calibration over the temperature range.

Another disadvantage of a temperature—controlled voltage source is that the temperature responsive element is in general somewhat remote from the display panel and has a different time—response under rapid changes of temperature. This means that until the temperature has stabilised, the contrast and legibility of the display will be degraded.

SUMMARY OF THE INVENTION

This invention provides a liquid crystal display comprising a plurality of liquid crystal elements; means for applying voltages across the elements; photo-detector means to detect the transmissivity of an element; and means for adjusting the voltages applied across the cells in dependence on the transmissivity detected.

The use of one of the elements of the display as a reference element, and the measurement of its actual transmissivity allows pre-selected optical properties e.g. contrast to be maintained even if there are changes in the physical condition of the material of the element e.g. due to temperature or ageing.

Voltages may be adjusted to obtain desired contrast or desired brightness.

The LCD may include a light source to provide a reference illumination of the element, and the photodetector may be arranged to detect the intensity of the light source retro-reflected through the element.

BRIEF DESCRIPTION OF THE DRAWING

Preferred embodiments of the invention will now be described by way of example with reference to the accompanying drawings in which.

DESCRIPTION OF THE PREFERRED EMBODIMENTS

Figure 1:
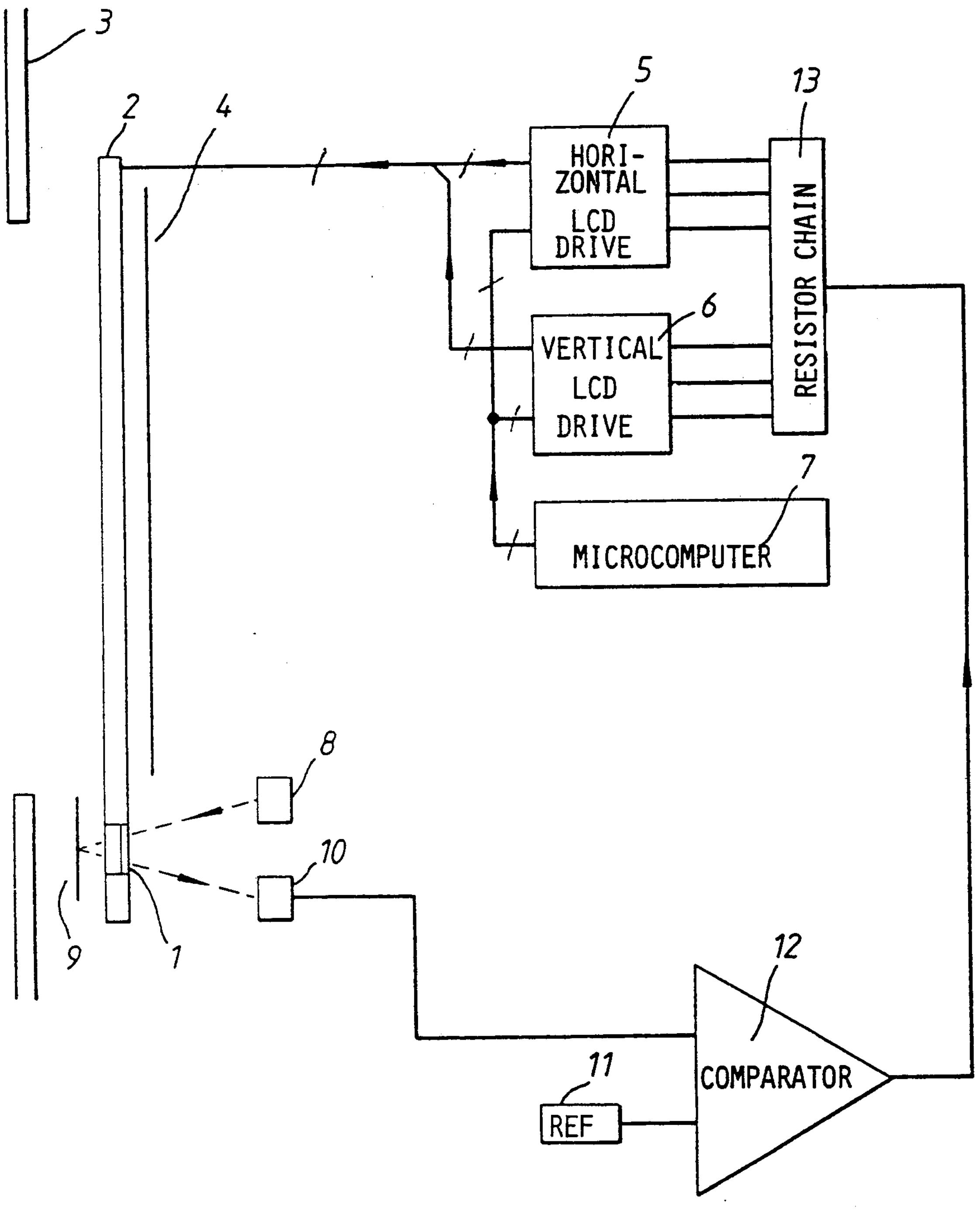
FIG. 1 shows a first embodiment of the invention in which a multiplexed LCD display has a reference cell constructed as an integral part of the display.

FIG. 1 shows a multiplexed Super Birefringent Effect (SBE) Liquid Crystal Display (LCD) comprising a matrix LCD display panel 2 having a main array of pixels which operate in the standard transflective or reflective mode in conjunction with either a rear mounted transflector and backlight, or a rear mounted reflector 4. A control pixel 1 is eclipsed from main view by the bezel and has a front mounted reflector 9. The control pixel 1 is substantially identical with the pixels of the main display. The control pixel is illuminated from the rear by a light source 8 such as a LED. Light from the light source passe through the control pixel 1, is reflected by the reflector back through the control pixel and falls on a photodetector 10. The control pixel 1 is driven alternately n fields on and m fields off by a spare row/column combination of the main horizontal 5 and vertical 6 LCD drive circuits. This is achieved by suitably programming the system control micro-computer 7. It is necessary to drive the control pixel 1 such that no DC bias be allowed to accrue across it.

The arithmetic mean of the output signal from the photodetector 10 is compared with a reference signal from a reference signal source 11 using a DC coupled Miller integrator-type comparator 12, the time constant-determining components of which are selected such as to effect satisfactory integration over the period of $n+m$ fields. The reference signal is chosen so as to correspond with the desired transmission of the control pixel and hence of the main display.

The output signal of the comparator is applied to the resistor chain 13 which generates the reference voltages for the horizontal and vertical driver circuits 5,6, thereby determining the V on and V off voltages of both the control pixel and the main display.

To provide optimum contrast, the control pixel is driven such that $m=n=2$, i.e. 2 fields on, and 2 fields off, and the reference signal is chosen so as to correspond with 50% transmission of the control pixel, and hence of the main display. This feedback ensures that V on and V off are always maintained at values which produce optimum contrast, even at extremes of temperature. This is because, although the temperature/voltage characteristics are non-linear at temperature extremes, the V on and V off voltages maintain their relationship relative to the 50% transmission voltage.

Under certain circumstances it may be advantageous to increase or decrease the absolute brightness of the display, even though this means departure from the optimum contrast. This can be done by changing the values of m and n such that the ratio between the ON time and the OFF time of the control pixel is varied, the reference value remaining constant. n and m are changed by reprogramming the microcomputer, which is easily done and requires no additional electrical connections. It also allows the brightness of the display to be controlled remotely, using a databus to reprogram the microcomputer.

Illumination of the reference pixel and monitoring of its transmission may be effected by pulsed operation, for example 100 .s per field, in applications where power consumption is critical. Sample and hold techniques are advantageously employed in such arrangements.

In the embodiment of FIG. 1, as the reference pixel is an integral part of the display, accurate stabilization of contrast or absolute illumination will be maintained under forced heating or cooling of the display, and for variations in the properties of the liquid crystal itself.

Figure 2:
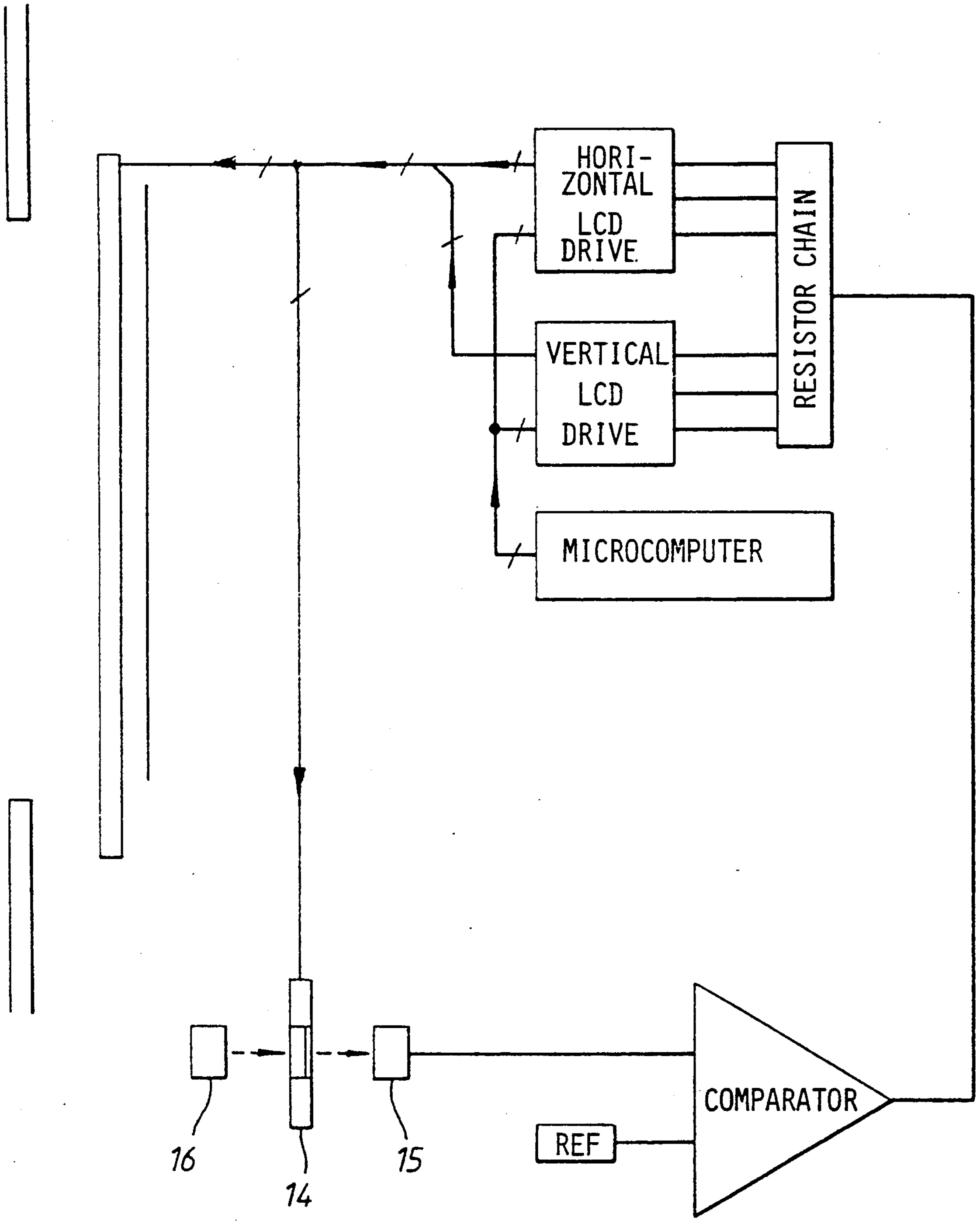
FIG. 2 shows a second embodiment utilising a discrete reference cell.

A second embodiment of the invention is shown in FIG. 2. The main difference between this and FIG. 1 is that the reference pixel is not an integral part of the main display, but forms part of an auxiliary LCD panel 14. The auxiliary LCD panel is made of the same material and has identical electrical and optical properties as the main display. Such an arrangement allows the photodetector 15 and the light source 16 to be placed on opposite sides of the auxiliary panel so as to operate the reference pixel in the transmission mode. Otherwise, operation is identical to the FIG. 1 embodiment.

Figure 3:
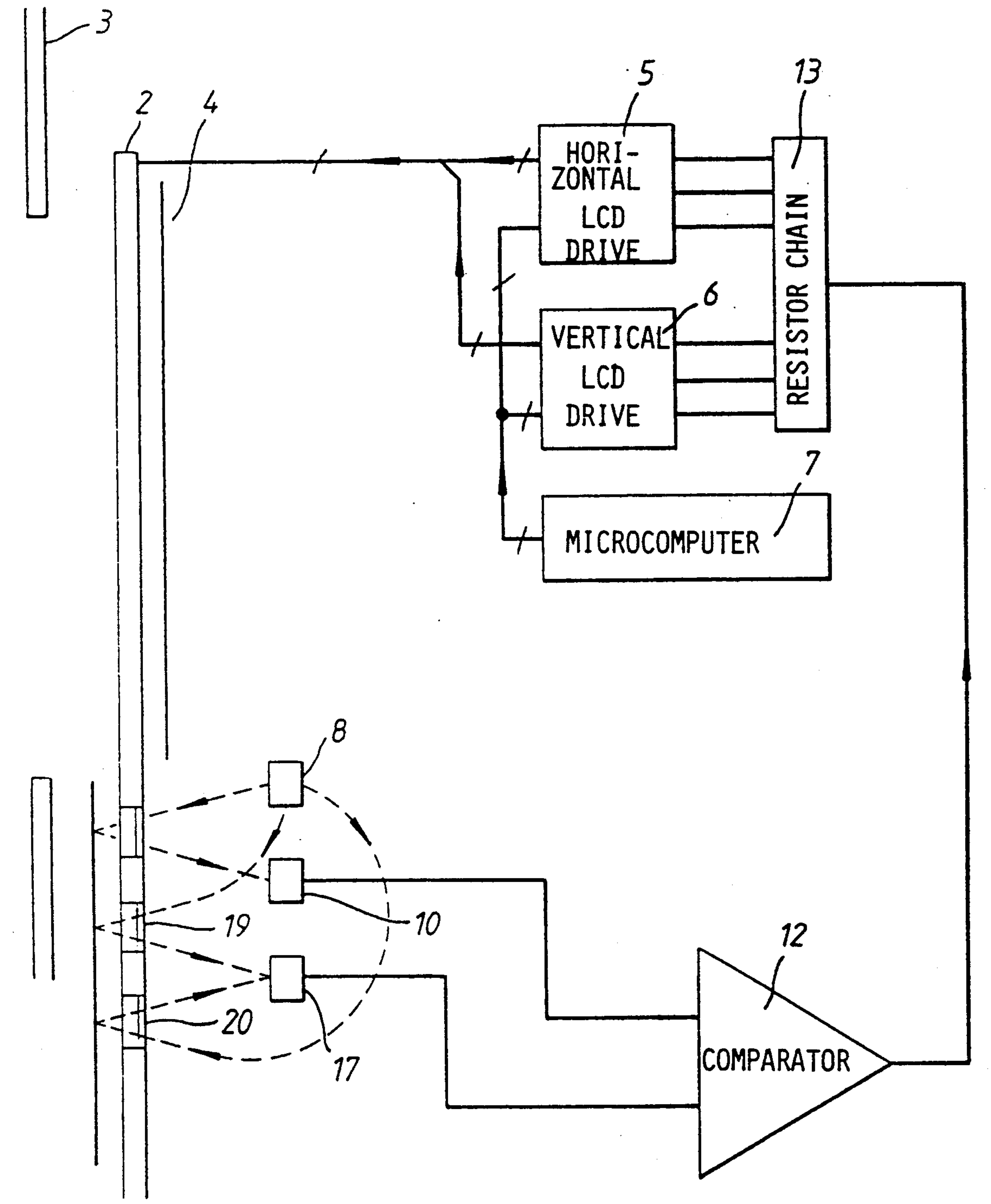
FIG. 3 shows a third embodiment which is a modification of FIG. 1 in which a reference level is determined automatically.

The embodiment of FIG. 3, shows a modification of the FIG. 1 embodiment in which the reference voltage is generated automatically. The reference voltage source 11 of FIG. 1 is replaced by second and third reference pixels 19, 20 and a second photodetector 17. The second reference pixel 19 is driven so as to be always hard ON, while the third reference pixel 20 is driven so as to be always hard OFF e.g. by applying zero volts across it. Light, which is conveniently obtained from the same light source 8 as that which illuminates the first reference pixel 1 of FIG. 1, is passed through the second and third reference pixels and falls on the second photodetector 17, which is preferably matched to the first photodetector 10. The second detector thus produces an output signal proportional to the sum of the best ON transmissivity and the best OFF transmissivity. It can be adjusted to give the desired reference value, namely half the sum of the ON transmissivity and the OFF transmissivity, by any convenient means. For example, the second and third reference pixels may each be constructed so as to have half the area of the first reference pixel, the second photosensor 17 may be half the area of the first photosensor 10, or the Miller integrator comparator 12 may include scaling circuitry e.g. a potential divider to reduce the value of the signal applied to it from the second photo sensor.

This arrangement is particularly advantageous as it requires no setting up or adjustment, even when different types of liquid crystal are used, the reference value always being set to give the optimum value for the particular liquid crystal being used.

Figure 4:
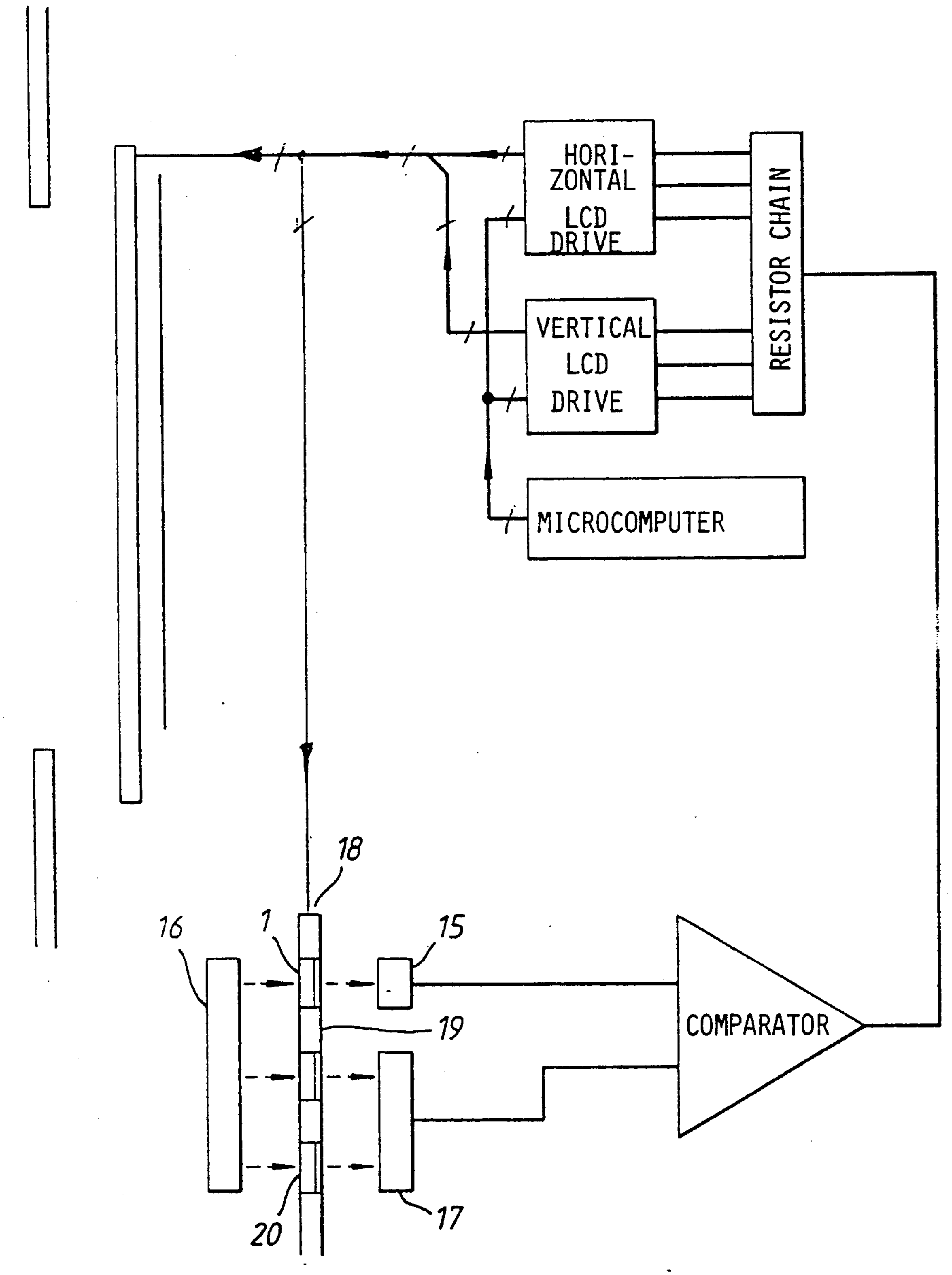
FIG. 4 shows a fourth embodiment which is a modification of FIG. 2 in which the reference level is determined automatically.

The embodiment of FIG. 4 is likewise a modification of FIG. 2, and like FIG. 3, has second and third reference pixels 19,20, the second 19 being always hard ON, the third 20 being always hard OFF.

These additional reference pixels are preferably, but not necessarily, constructed in the same auxiliary LCD panel as the first reference pixel. Operation is otherwise the same as the embodiment of FIG. 3.

Figure 5:
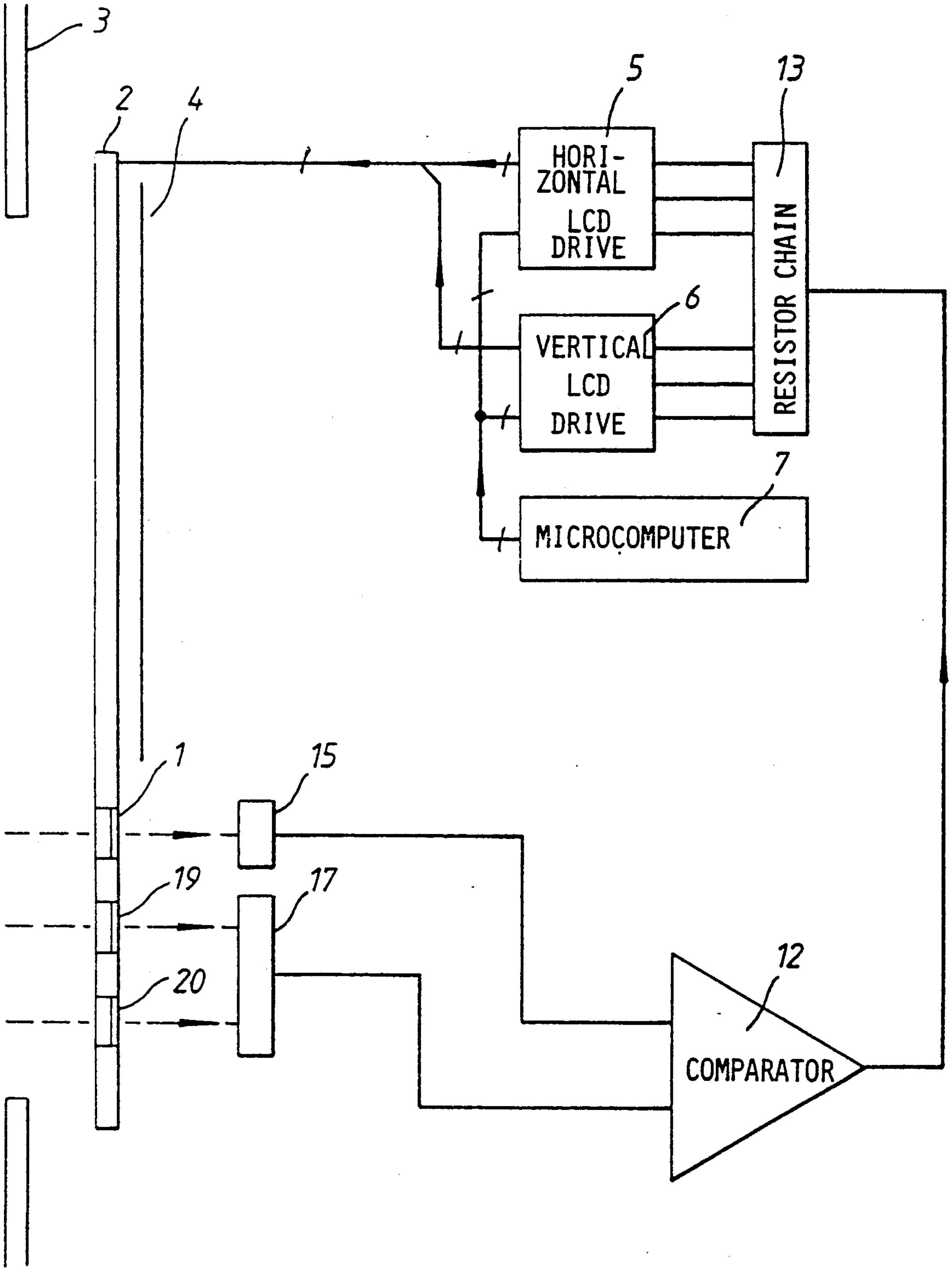
FIG. 5 shows a fifth embodiment which is a modification of FIG. 3.

The embodiment of FIG. 5 is a modification of FIG. 3. In this embodiment, the light source 8 of FIG. 3 is not used; instead the ambient light incident on the front of the display is allowed to pass through the first, second and third reference elements. Otherwise operation is identical with the FIG. 3 embodiment.

While the description refers to light, this invention is not restricted to visible light, but also encompasses non-visible light e.g. ultra-violet and infra-red.

Further, while the invention has been described with particular reference to a matrix array, the invention is not restricted to the particular embodiments described. It is equally applicable to multiplexed LCDs in the form of alphanumeric displays, and indicators, or to non-multiplexed LCDs.

We claim:

1. A liquid crystal display comprising;

a plurality of liquid crystal elements;

means for applying voltages across the elements;

photodetector means to detect the transmissivity of one of said plurality of elements;

means to repetitively switch said one element at predetermined times between a first state in which it exhibits a first level of transmissivity and a second state in which it exhibits a second level of transmissivity lower than the first level;

means coupled to the said photodetector means for obtaining a signal corresponding to the mean transmissivity of the first and second transitivities;

means for comparing the obtained signal with a reference signal representative of a desired mean transmissivity;

means for producing the reference signal; and means for adjusting the voltages applied across the plurality of elements in dependence upon the difference between the obtained and desired reference signals, whereby the mean transmissivity of the liquid crystal elements is maintained at the desired mean transmissivity.

2. A liquid crystal display as claimed in claim 1 in which the elements are arranged such that respective first electrodes of a number of elements are coupled to a single driver stage such that all elements are individually addressable.

3. A liquid crystal display as claimed in claim 2 in which the elements are disposed in a matrix of rows and columns.

4. A liquid crystal display as claimed claim 1 in which the means for producing the reference value comprises first and second reference element means, and further photodetector means, the first reference element means being maintained in the first level of transmissivity, the second reference element means being maintained in the second level of transmissivity, the further photodetector means being coupled to the first and second reference elements so as to produce a signal representing the mean transmissivity of the first and second elements; the signal so produced comprising the said reference value.

5. A liquid crystal display as claimed in claim 1 in which the said element is illuminated in reflective mode by a light source disposed on the same side thereof as the said photodetector means.

6. A liquid crystal display as claimed in claim 1 in which the said element is illuminated in transmissive mode by a light source disposed on the opposite side thereof from the said photodetector means.

7. A liquid crystal display as claimed in claim 4 in which the first and second reference elements are illuminated in reflective mode by a light source disposed on the same side thereof as the said photodetector means.

8. A liquid crystal display as claimed in claim 4 in which the said element and the first and second reference elements are illuminated in transmissive mode by a light source disposed on the opposite side thereof from the said photodetector means.

9. A liquid crystal display as claimed in claim 1 in which the time for which the said element is in the first state and the time for which the said element is in the second state, are independently adjustable.

10. A liquid crystal display as claimed in claim 1 in which the time for which the said element is in the first state is substantially the same as the time for which the said element is in the second state.

11. A liquid crystal display as claimed in claim 9 in which the times for which the said element is in the first and second states respectively are adjustable so as to adjust either the absolute level of brightness, or to provide maximum contrast of the display.

12. A liquid crystal display as claimed in claim 9 comprising a microcomputer to produce signals which determine the switching of the elements of the liquid crystal display between first and second states in which the time relationship between the first and second states of the said elements is varied by reprogramming the microcomputer.

* * * * *